Oct. 17, 1939. J. L. ANDERSON 2,176,237
PIPE OR TUBE WELDING
Filed July 18, 1936
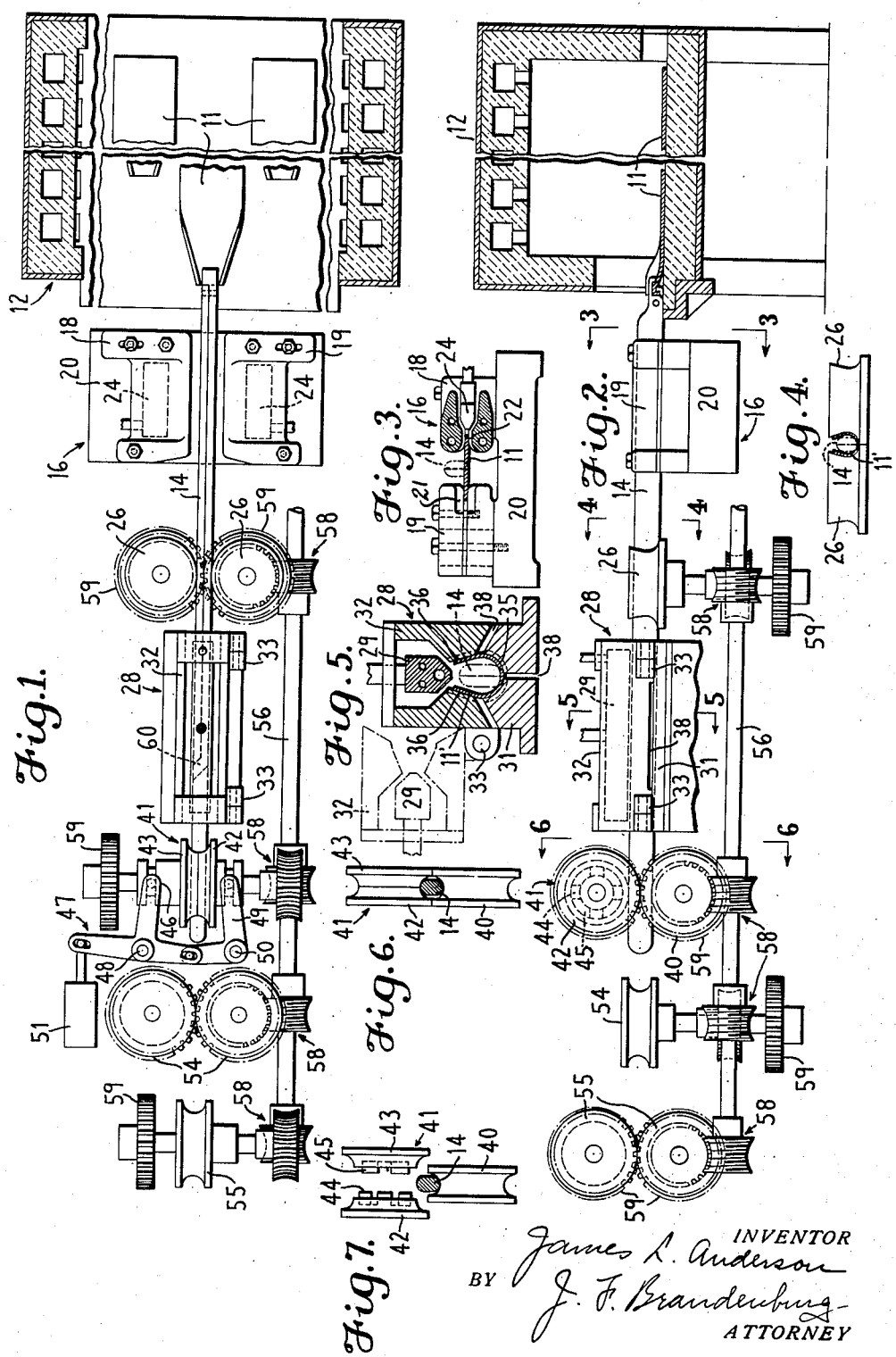

Patented Oct. 17, 1939

2,176,237

UNITED STATES PATENT OFFICE 2,176,237

PIPE OR TUBE WELDING

James L. Anderson, Closter, N. J., assignor to Air Reduction Company, Incorporated, New York, N. Y., a corporation of New York Application July 18, 1936, Serial No. 91,292

9 Claims. (Cl. 78—87)

This invention relates to apparatus for making welded pipe or tubing from flat or partially formed skelp, and is especially intended for welding high carbon and alloy steels which can not be heated to a high temperature without deterioration.

One of the most economical and practical methods of making welded pipe and tubing is by pulling furnace-heated skelp through a die or bell by means of a drawbench, but that method can not be used with some kinds of skelp, such as high carbon and alloy steels. Because of the moderate temperature at which such steels must be withdrawn from the skelp-heating furnace, the surface of the metal is not covered with liquor and the body of the skelp remains relatively stiff, so that friction in a bell causes the outside surface of the pipe or tube to be scratched and makes the product less salable.

It is an object of this invention to provide improved apparatus for making pipe and tubing with the speed and economy of the bell weld method, but from any kind of skelp and with less than the usual furnace heating. The invention includes rolls which form and close the tube, and has edge heating retorts for bringing the edge faces of the seam to a temperature sufficiently high for welding even though the skelp has had no furnace heating. The edge faces are preferably brought to a state of surface fusion, and some initial furnace heating is highly desirable as a means of increasing both the speed and economy of the welding.

Another object is to provide novel apparatus for withdrawing skelp from a heating furnace and for advancing it into and through forming and welding rolls. The invention includes tongs constructed and arranged to fit into and be grasped by the same power-driven rolls that advance the pipe or tube through the welding apparatus. A novel roll construction admits the tongs into a roll pass and then grips them frictionally to advance them and the connected skelp.

Another object of the invention is to provide improved apparatus for withdrawing skelp from the furnace and drawing it through forming and welding apparatus without the use of a drawbench. The preferred form of the apparatus includes tongs having a height equal to the diameter of the tube to be welded, and moves the tongs through power-driven rolls until the skelp is formed and its end advanced into the rolls far enough for the metal to be thereafter drawn forward by the rolls without the need of tongs.

Other objects, features and advantages of the invention will appear or be pointed out as the specification proceeds.

In the accompanying drawing, forming part hereof:

Fig. 1 is a plan view of pipe or tube welding apparatus embodying the invention;

Fig. 2 is a side elevation of the apparatus shown in Fig. 1;

Fig. 3 is a sectional view taken on the line 3—3 of Fig. 2 with one end of the right-hand retort body broken away to show the torch, and with the skelp shown in the retort;

Fig. 4 is a sectional view on the line 4—4 of Fig. 2 but showing the skelp passing between the rolls;

Fig. 5 is an enlarged sectional view taken on the line 5—5 of Fig. 2 but showing the partially formed skelp in the retort;

Fig. 6 is a sectional view on the line 6—6 of Fig. 2; and

Fig. 7 is a view similar to Fig. 6 but showing the parts of the upper welding roll separated.

Skelp 11 is heated in a furnace 12. The temperature to which it is heated before being drawn from the furnace depends upon the material of the skelp and the temperature to which such material can be raised without injury and without unduly limiting its strength. The higher the skelp is heated in the furnace, the less the additional heat which must be put into the edges before they are welded. Such a reduction in the required amount of edge heating makes possible either higher speed or the use of less fuel in the edge heating retorts.

The skelp is drawn from the furnace with a tongs 14 which has a height equal to the outside diameter of the tube which is to be made from the skelp 11. Figs. 1 and 2 show a piece of skelp with its end gripped in the tongs 14 and pulled partway out of the furnace.

A skelp guide and retort 16 is located near the exit of the furnace. This retort comprises right and left-hand retort bodies 18 and 19 secured to a base 20 and adjustable toward and from one another on the base. The retort bodies have channels 21 and 22, shown in Fig. 3, and the retort bodies are so spaced that the edges of the skelp 11 extend into these channels, and the ends of the channels serve as guides to prevent lateral displacement of the skelp.

The height of the channels 21 and 22 is somewhat greater than the thickness of the skelp but the channels smooth out any waves in the skelp and hold the edge faces near enough to a straight line for them to be uniformly and effectively heated by torches 24 located within the retort bodies in positions to direct flame jets against the edge faces of the skelp through slots in the bottoms of the channels 21 and 22. The detailed construction of such a retort is shown in my Patent No. 2,053,235, dated September 1, 1936, but a knowledge of the specific construction is not necessary for a complete understanding of this invention.

Beyond the retort 16, the skelp passes between forming rolls 26 which bend it to a horseshoe cross-section, such a partially formed skelp being indicated by the reference character 11' in Fig. 4. After passing between the forming rolls 26, the partially formed skelp 11' travels through a retort 28 in which the edge faces of the skelp are heated by a torch 29. This torch has two rows of jet orifices and flames are directed from each row against the respective edge faces of the partially formed skelp.

The retort 28 includes a fixed lower section 31 and an upper section 32 which is joined to the lower section by hinges 33. This construction permits the retort to open to admit the tongs 14. The torch 29 is carried by the upper section of the retort and moves with that section when the retort is opened into the dotted line position shown in Fig. 5.

When the retort 28 is closed, the inside surfaces 35, 36 of the upper and lower sections 31 and 32 register at their edges and comprise a guide surface for the partially formed skelp 11'. The guide surfaces 35, 36 are preferably grooved to permit the products of combustion of the flame jets to flow across the outside surface of the skelp. The products of combustion escape from the retort 28 through exhaust ports 38. When the torch 29 utilizes an oxyacetylene gas mixture, the product of the primary combustion of the flame jets is itself combustible and its burning furnishes active assistance in the heating operation and blankets the surface of the skelp with a reducing atmosphere.

Beyond the retort 28 are "welding" rolls 40 and 41. These rolls complete the forming of the skelp by bringing the edges together. The lower roll 40 is of usual construction, but the upper roll 41 is made in two parts 42, 43 having jaws 44, 45 which fit together so that both parts of the roll turn as a unit when brought together. When the parts of the roll 41 are together it has a smooth face with the same semi-circular concave contour as the lower roll 40.

Mechanism for moving the parts of the roll 41 is shown diagrammatically in Fig. 1. The part 43 of the roll has a grooved hub into which a yoke 46 extends for shifting the hub toward and from the other part of the roll. The yoke 46 is a part of a three-armed lever 47 which has a fulcrum 48. The part 42 of the roll has a grooved hub which is shifted to open and close the roll 41 by a yoke arm of a bell crank 49. This bell crank rocks about a fixed pivot 50 and is connected with one arm of the lever 47 by a pin and slot connection so that a single fluid motor 51 connected to another arm of the lever 47 moves both of the parts 42 and 43 simultaneously to separate them sufficiently to permit the tongs 14 to pass between them and then bring the parts of the roll together above the tongs. The tongs have a height equal to the diameter of the pass between the rolls 40 and 41, and are frictionally gripped by the rolls as shown in Fig. 6.

Rotation of the rolls 40 and 41 advances the tongs 14 through the apparatus at the same speed that these rolls advance the welded tube after the skelp has reached them and been closed to complete the forming and welded by bringing the highly heated edge faces together.

From the welding rolls 40 and 41, the tongs 14, and later the welded tube, are advanced into the passes between other rolls 54 and 55. There is a portion of the tongs near the jaws that will not be gripped in any of the roll passes, and the front end of the skelp does not make a complete tube but the distance from the rolls 40, 41 to the rolls 55 is sufficiently long so that the complete tube is in the bite of the rolls 40, 41 before the low end portion of the tongs reaches the rolls 55. Two or more of the rolls 40, 41, 54 and 55, therefore, propel the tongs or tube forward at all times.

All of the rolls are driven from a common power shaft 56 through worm gearing 58. The opposite rolls of each roll pass are connected by spur gears, indicated by the reference character 59.

In making welded tubes with the apparatus of this invention, the tongs 14 are first closed on the front end of a skelp 11. While an attendant is manipulating the tongs to grip the skelp, the tongs extend upward away from the jaw end, and usually somewhat to the side of the forming and welding apparatus, depending upon the position of the attendant and the particular angle at which he finds it most convenient to work the tongs.

When the tongs 14 are closed on the end of the skelp, they are locked closed by hooking the short handle of the tongs over the longer handle at 60 in a manner well understood in the art. With the tongs 14 locked closed in this manner, they are of substantially uniform height from a point near their pivot to the end remote from the jaws.

The tongs 14 are then moved into a position directly over the rolls and lowered into the position shown in Figs. 1 and 2. There is sufficient space between the retort bodies 18 and 19, and between the forming rolls 26, to admit the tongs. The retort 28 is in the position indicated by the dotted lines in Fig. 5, and the upper welding roll 41 is split to allow the tongs to enter the retort 28 and come down into contact with the lower welding roll 40. The retort 28 is then closed and the two parts of the upper welding roll 41 brought together. The tongs 14 are gripped by the welding rolls and advanced into the passes between the rolls 54 and 55 while the skelp 11 is pulled from the furnace and through the successive retorts and roll passes.

The forming rolls 26 bend the skelp into a partially formed tube, and the welding rolls 40 and 41 complete the forming and bring the edges together to make the weld. It will be understood that the rolls of the different stands can be moved toward and from one another to adjust the width of the roll passes in the usual manner, and the skelp may, under some circumstances, be formed and closed in a single roll pass instead of in two sets of rolls.

Although most of the description and some of the claims describe "tube" welding, it will be understood that either "pipes" or "tubes" come within the scope of the invention.

Various changes and modifications will suggest themselves, and features of the invention can be used without others.

I claim:

1. Apparatus for making welded pipes or tubes from furnace-heated skelp including in combination, a roll pass comprising two rolls having concave peripheral faces, and one of which is split along a line near the peripheral center line of the concave face, a skelp-pulling device, and mechanism adapted to cause relative movement of the parts of the split roll toward and from one another to effect a temporary separation of said parts far enough to admit the skelp-pulling device into the roll pass.

2. In a pipe or tube mill, a roll stand including a lower roll having a concave peripheral face, an upper roll comprising right and left-hand portions having jaws on their confronting surfaces which engage to cause both portions to turn as a unit, a skelp-pulling tool, and means for opening the roll pass to admit the skelp-pulling tool including mechanism for moving at least one portion of the split roll toward and from the other portion of that roll for a distance substantially greater than the length of said jaws.

3. Pipe or tube welding apparatus including upper and lower welding rolls which grip a pipe or tube to propel it, tongs for pulling the metal into the apparatus, said tongs having a height substantially the same as the tube so that the tongs are gripped and propelled by the welding rolls ahead of the front end of the metal, said upper welding roll being of a split construction adapted to open to permit the tongs to be laid on the lower welding roll from above, power mechanism for driving at least one of the welding rolls, and means for closing the upper welding roll on the tongs to grip said tongs in the bite of the welding rolls and cause them to be propelled by said welding rolls.

4. The combination with a skelp heating furnace, of a number of stands of rolls in position to receive skelp as it is pulled from the furnace, said stands including a welding roll stand and at least one forming roll stand between the welding roll stand and the furnace, a device for pulling a skelp from the furnace, said device being of large enough cross-section to be gripped in the pass of the welding roll stand, and being of such length that with one end connected to a skelp in the furnace the other end is beyond a plurality of said roll stands, including the welding roll stand, said rolls being constructed and arranged to admit the skelp-pulling device, and power means for rotating said rolls to cause them to propel said device and pull the skelp from the furnace into the roll passes.

5. In a pipe or tube mill, forming and welding rolls which bend the skelp to tubular form and bring the heated edges together to make a weld, a device for drawing the skelp from a furnace and into the forming and welding rolls, said device being of a large enough cross-section to be gripped between the welding rolls and advanced by the rotation of said welding rolls, and other rolls beyond the welding rolls for similarly gripping and propelling first the skelp-drawing device and then the welded tube after said device has passed beyond said other rolls.

6. Tube welding apparatus comprising welding rolls through which the tube passes, means for forming and heating the tube ahead of the welding rolls including forming rolls that bend the skelp and retort means which are located between the forming and welding means and which project heating agencies directly against the edge faces of the skelp, a device for pulling skelp through the edge heating retort means and between the forming rolls, and into the welding rolls, said device being of such a cross-section that it is gripped between the welding rolls, and mechanism for rotating the welding rolls to advance the skelp-pulling device and the skelp through the apparatus.

7. In tube welding apparatus in which skelp is drawn by a skelp-pulling tool through forming and welding apparatus that has rolling contact with the skelp and includes a plurality of welding rolls forming a pass which causes the edges of the tube to come together and make a weld, the improvement which comprises a skelp-pulling tool having a cross-sectional dimension equal to the diameter of the roll pass so that said tool is gripped between the welding rolls in the same pass that brings the edges together to make a weld, and power mechanism for rotating the welding rolls to cause them to advance first the pulling tool and then the tube.

8. Tube welding apparatus comprising a furnace for heating skelp, forming and welding rolls which progessively bend the skelp to tubular form and bring the edges together to make the weld as the skelp is pulled through the apparatus, retort means through which the skelp is drawn as it comes from the furnace, at least a part of said retort means being located between the forming and welding rolls, heating means in the retort means for projecting flame jets directly against the edge faces of the skelp, tongs adapted to grip the end of a skelp in the furnace, said tongs being of sufficient length to reach to the welding rolls when the jaw-end of the tongs is connected with a skelp in the furnace, and being of sufficient cross-section to cause the welding rolls of the apparatus to grip the tongs, and mechanism for rotating the rolls that grip the tongs.

9. Tube welding apparatus including in combination two or more roll stands, each of which has rolls constituting a pass through which the tube travels, power driving mechanism for rotating said rolls, tongs longer than the distance between successive roll passes and having a cross-sectional dimension equal to the height of said roll passes so that the tongs are gripped and advanced by the same surfaces of the rolls of both passes that contact with the tube, and mechanism for separating some of the parts forming at least one of the roll passes so that the tongs can be initially inserted from a direction transverse of the direction of movement of the tongs and tube as they are advanced through the apparatus by the power-driven rolls.

JAMES L. ANDERSON.